No. 793,117. PATENTED JUNE 27, 1905.
T. S. WITHERBEE.
STORAGE BATTERY JAR.
APPLICATION FILED MAR. 12, 1904.

Witnesses
Inventor
T. S. Witherbee
By Stuart & Stuart
Attorneys

No. 793,117. Patented June 27, 1905.

UNITED STATES PATENT OFFICE.

THOMAS S. WITHERBEE, OF JERSEY CITY, NEW JERSEY, ASSIGNOR TO WITHERBEE IGNITER COMPANY, A CORPORATION OF NEW JERSEY.

STORAGE-BATTERY JAR.

SPECIFICATION forming part of Letters Patent No. 793,117, dated June 27, 1905.

Application filed March 12, 1904. Serial No. 197,858.

*To all whom it may concern:*

Be it known that I, THOMAS S. WITHERBEE, a citizen of the United States of America, and a resident of Jersey City, county of Hudson, and State of New Jersey, have invented certain new and useful Improvements in Storage-Battery Jars, of which the following is a specification.

My invention relates to a storage-battery jar, and is designed for the purpose of providing a jar which may be advantageously used on automobiles or other places where it is likely to be jolted and where the acid contained in the jar would probably be spilled unless careful provision were made against this result.

Figure 1:
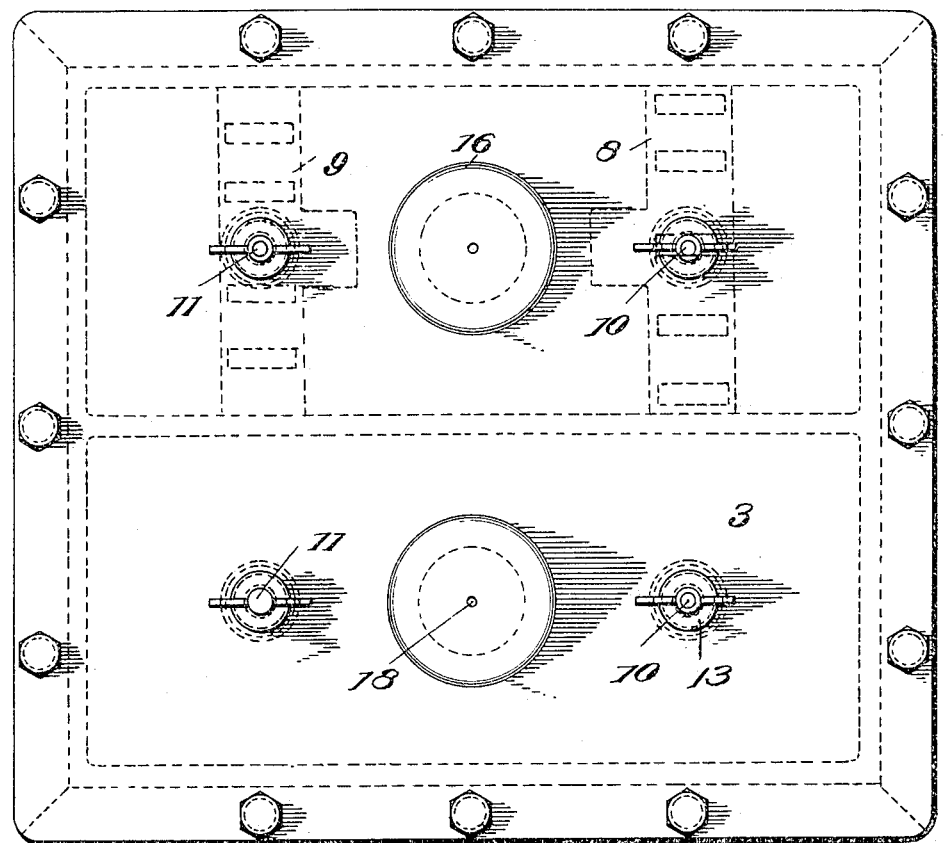
Figure 2:
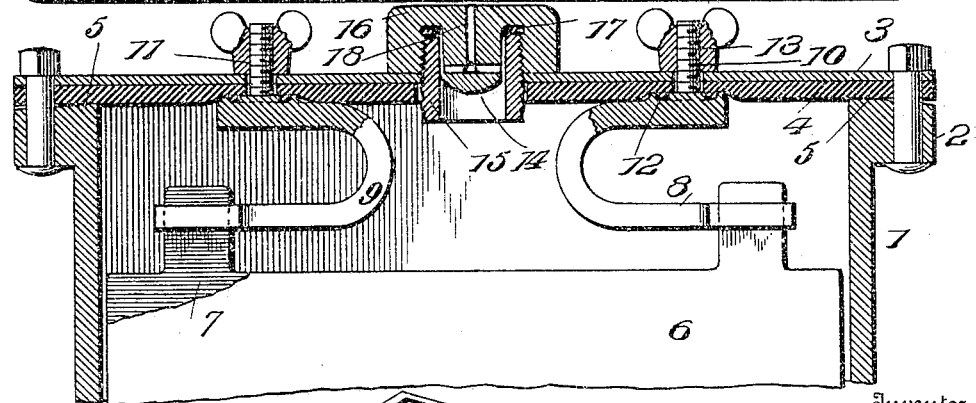

Referring to the drawings, Figure 1 is a plan view of my battery-jar; Fig. 2, a vertical transverse section of the upper portion of the jar, and Fig. 3 a perspective view of the plate-holder.

Referring to Fig. 1, the jar is shown divided into two cells and having a cover bolted onto the top of the jar, covering both cells. Through the cover protrude binding-posts and vents.

1 is the jar, having a flange 2 surrounding its upper edge, which is perforated with holes to receive bolts.

3 is the cover, having holes similar to those in the flange 2, through which the bolts pass.

4 is the soft-rubber sheet which forms a gasket for the lid and is of the same size as the cover. The upper edge of the jar is flat upon its inner surface and beveled from the flat portion outward to the outer edge, leaving a horizontal portion 5, which localizes the pressure of the cover upon the soft-rubber gasket 4 and serves to form a tight joint between the cover and the jar.

6 and 7 are positive and negative battery-plates.

8 is the yoke by which the positive plates are connected to their binding-post.

9 is the yoke by which the negative plates are connected to their binding-post.

10 is the binding-post of the positive plates, and 11 the binding-post of the negative plates.

Figure 3:
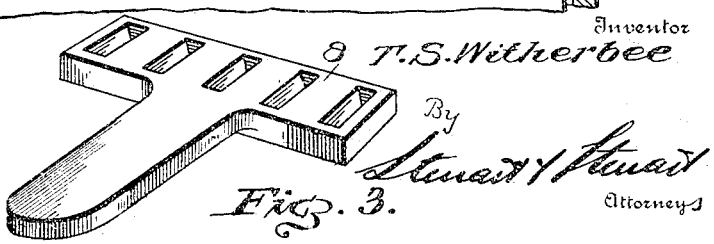

It will be noticed that the yoke shown in perspective in Fig. 3, after having been secured by soldering to the plates and having its arm extending inward, is bent upward and outward until the binding-post 10, which is soldered into its end, is vertical and may be passed through a suitable aperture in the cover 3. Surrounding the binding-post 10 is an annular recess and annular flange 12. In the arrangement of the battery-plates in the jar it is designed that the upper surface of the annular flange 12 shall stand a little above the level of the top of the jar, so that when the soft-rubber gasket is pressed down upon the flange by the cover an acid-tight joint will be formed around the binding-post 10. This joint will be reinforced when the nut 13 of the binding-post is screwed home. The location of the yoke-arms projecting inward and then turned outward will have the effect of steadying the plates in the cell and preventing them from tilting out of place. The bend of the arm will also have the effect of permitting the end of the arm carrying the binding-post to be bent laterally, so as to permit it to register with the hole provided for it in the cover of the jar.

In the center of the cover is a gas-vent 14. This gas-vent consists of a cylinder 15, screwed into the center of the cover, upon the top of which is screwed a cap 16, having within it a gasket 17, which rests upon the top of the cylinder 15. 18 is the gas-vent in the center of the cap. From the under side of the cap at its center depends a portion of diameter less than that of the sleeve, through which there are lateral and vertical channels. The vertical channel descends from the top until it intercepts the lateral channels and there stops, so that there are only lateral openings into the jar.

In operation the gas-vent 18 will prevent any acid from escaping from the jar. The acid as it is splashed by the motion of the vehicle up onto the sides of the head will flow back into the jar, and it will be quite impossible for any portion of the acid to escape from the jar.

Having thus described my invention, what I claim, and desire to secure by Letters Patent, is—

1. In a battery-jar, the combination with a jar and cover, two sets of plates forming a plurality of sets of electrodes within the jar, each set of plates secured to a suitable yoke, the yoke having an arm which extends inward and is then bent upward and outward, and a binding-post on the end of the arm adapted to pass through the cover.

2. In a battery-jar, the combination with a jar and cover, two sets of plates forming a plurality of sets of electrodes within the jar, a yoke for each set of plates provided with openings, extensions on each plate adapted to enter openings to secure each plate to its yoke, each yoke having an arm which extends inward and is then bent upward and outward, and a binding-post on the end of the arm adapted to pass through the cover.

3. In a battery-jar, the combination of a jar and cover, the cover being provided with a gas-vent which consists of a sleeve screwed into an aperture in the cover and closed by a cap from which there is a pendent portion of smaller diameter than the inside diameter of the sleeve, the pendent portion having vertical and lateral passage-ways which intercept each other, the lateral passage-ways opening into the space between the pendent portion and the sleeve and the vertical passage-way extending from the lateral passage-way to the air, whereby there are only lateral openings into the jar.

4. In a battery-jar, the combination of a jar and cover, a soft-rubber sheet interposed between the jar and cover, a plurality of sets of electrodes forming two sets of plates within the jar, each set of plates secured to a suitable yoke to which is secured a binding-post and having an annular flange and recess on the yoke surrounding the binding-post, which is adapted to be seated in the soft-rubber sheet when the binding-post is passed through the rubber sheet and cover, substantially as described.

Signed by me at New York city, county and State of New York, this 9th day of March, 1904.

THOMAS S. WITHERBEE.

Witnesses:
PAUL BONYNGE,
EMMA W. FINLAYSON.